S. F. SEELY.
CULTIVATOR AND PLOW.
No. 67,595.                                   Patented Aug. 6, 1867.
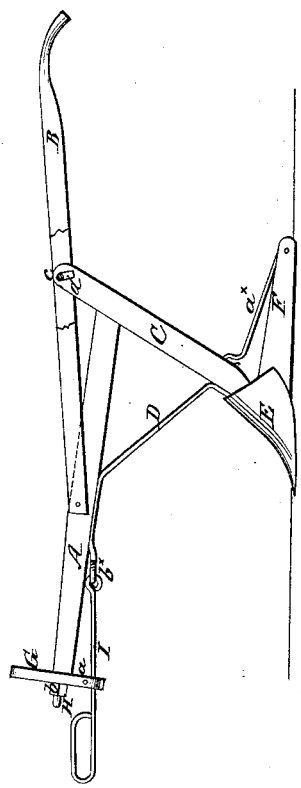
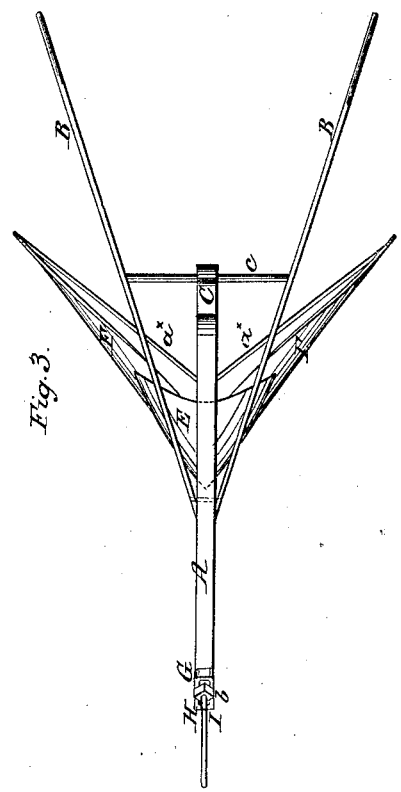
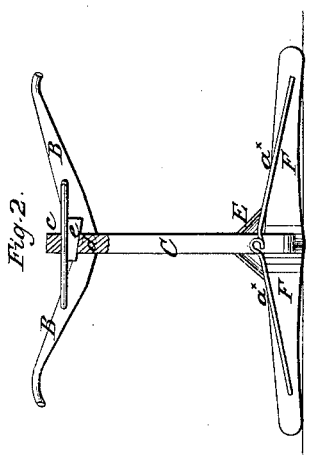
Witnesses.
Theo. Tusch.
J. A. Service.
Inventor
S. F. Seely
Per Munn &
Attys.

United States Patent Office

S. F. SEELY, OF SYLVANIA, OHIO.

Letters Patent No. 67,595, dated August 6, 1867.

---

IMPROVEMENT IN CULTIVATOR AND PLOUGH.

---

*The Schedule referred to in these Letters Patent and making part of the same.*

---

TO ALL WHOM IT MAY CONCERN:

Be it known that I, S. F. SEELY, of Sylvania, in the county of Lucas, and State of Ohio, have invented a new and improved Cultivator and Hilling-Plough; and I do hereby declare that the following is a full, clear, and exact description thereof, which will enable others skilled in the art to make and use the same, reference being had to the accompanying drawings, forming part of this specification, in which—

Figure 1 is a side view of my invention.
Figure 2, a rear view of the same, with the standard in section, as indicated by the line $xx$, fig. 3.
Figure 3, a plan or top view of the same.
Figure 4, a detached view of a slide pertaining to the same.

Similar letters of reference indicate like parts.

This invention relates to a new and improved cultivator and hilling-plough, and the invention consists in a novel draught-attachment, so arranged that the line of draught may, by a simple adjustment of a slide, have such a direction, relatively with the share and the wings which are attached to it, that the device may be adapted for cultivating the soil, that is to say, taking out weeds and pulverizing the surface of the soil; or adapted for hilling plants, and also be capable of being adapted to suit the width of the spaces between the rows of plants without any adjustment of the wings or any part pertaining directly to the share.

A represents the beam of the plough, having handles, B B, attached to it, and C is an inclined standard C a share, E, is secured, of V-form, and having two inclined sides, to each of which a wing, F, is attached. These wings are curved both in a longitudinal and transverse direction, the front parts of the wings, which are secured to the share, being inclined at an angle of about forty-five degrees, and gradually assuming an inclined position in a transverse direction to their rear ends, where they are precisely vertical. These are braced by rods $a^*.a^*$ from the lower ends of the standard C. G is a loop or link, the sides of which are attached to the share, being inclined transversely through it near one end. This loop or link is fitted with each other, and has a rod, $a$, passing transversely through it near one end. This loop or link may be adjusted higher or lower, the front end of the beam A by means of a screw, H, which is fitted in the end of the beam, passes through the loop or link, which is attached to the under side of the beam A by a joint, $b^*$, and passes through the I is a rod, as shown clearly in fig. 1. The draught animal is attached to the front end of the rod I. The G, are connected by a cross-rod, $c$, which passes through an oblong slot, $d$, in the upper part of the standard $e$ is a wedge or key, which is driven in slot $d$ to secure the cross-rod $c$ and the handles B B in position 2,) or may be held in position by a set-screw.

From the above position, it will be seen that when the draught-rod I is secured in the lower or loop G, underneath the rod $a$, the plough portion will be thrown in a horizontal position, the wings passing over the wings, completely cutting out weeds, grass, etc., and leaving a smooth surface device; under this adjustment of the draught-rod I, operates as a cultivator, and when it is desired a hilling-plough the rod $a$ is removed from the loop or link, and the latter so adjusted as to allow three or four inches play between the bottom of the loop or link and the beam. By this means who has hold of the handles B B, may raise or lower the plough at will, so that the wings F soil a greater or less distance of their length, according to the width of the spaces between plants.

When the device is used as a hilling-plough, the cross-rod $c$ of the handles is secured at the slot $d$ in the standard, the wedge $e$ being driven in the upper part of the slot $d$, the wedge $e$ being driven in the slot above the rod $c$, and when a cultivator the rod $c$ is secured in the upper part of the slot $d$, the wedge $e$ being driven in the rod $c$.

Thus, by this simple means, I can adapt the device to hilling purposes, so that it will a foot in height, or so that it may be used as a cultivator and leave the soil nearly level.

Having thus described my invention, what I claim as new, and desire to secure by

The jointed draught-rod I, adjustable link G, beam A, standard C, with oblong slot share E, wings F, cross-rod $c$, and brace-rods $a^*$, combined, arranged, and operated substantially for the purpose specified.

Witnesses:
J. H. TAPPAN,
D. E. MERRILL.